No. 758,125. PATENTED APR. 26, 1904.
C. B. BAUMGARTNER.
WIRE FENCING.
APPLICATION FILED JUNE 26, 1903.
NO MODEL.
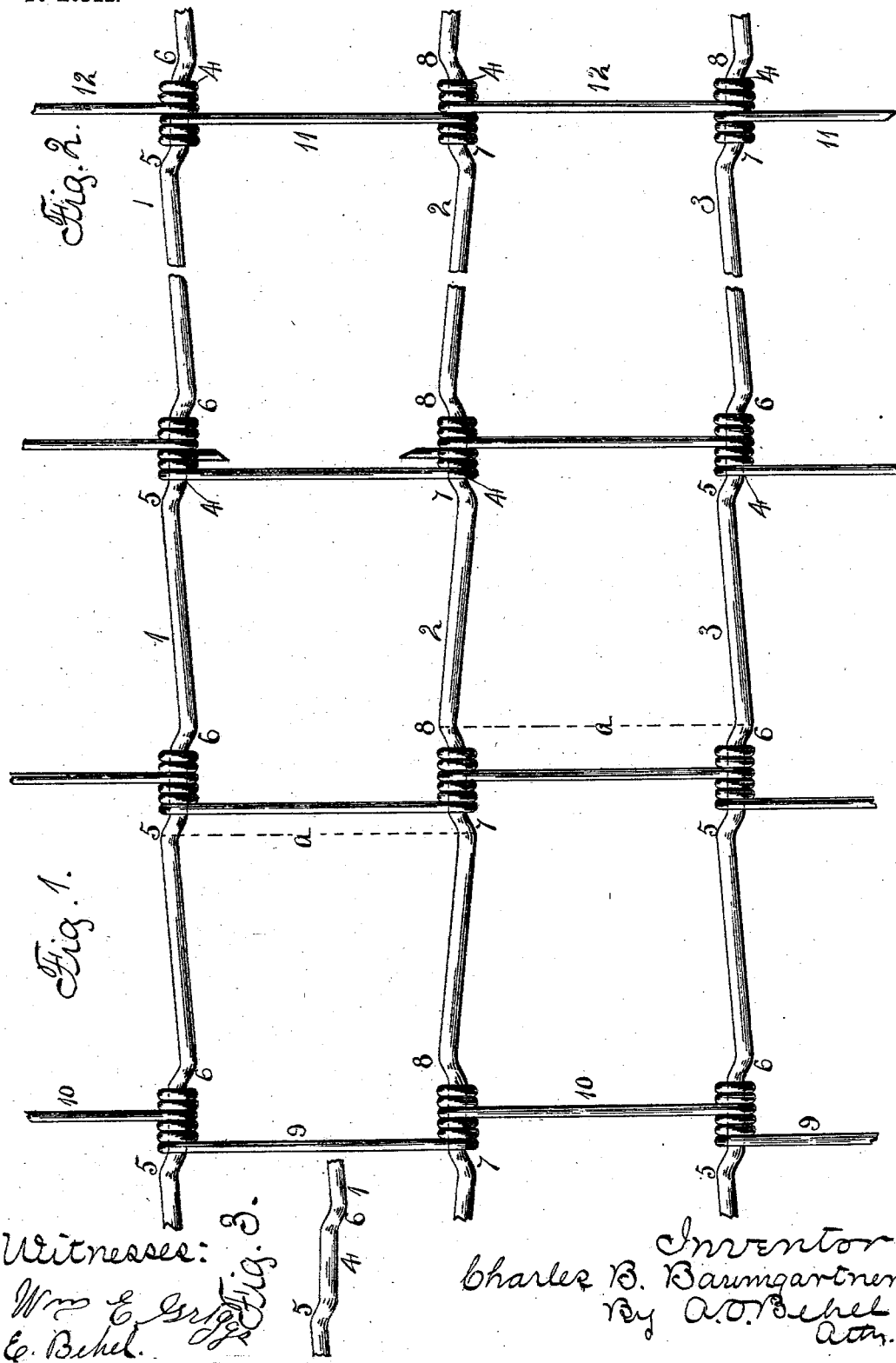
Witnesses:
Wm E. Grigg
E. Behel
Inventor:
Charles B. Baumgartner
By A. O. Behel
Atty.

No. 758,125. Patented April 26, 1904.

UNITED STATES PATENT OFFICE.

CHARLES B. BAUMGARTNER, OF CHICAGO, ILLINOIS.

WIRE FENCING.

SPECIFICATION forming part of Letters Patent No. 758,125, dated April 26, 1904.

Application filed June 26, 1903. Serial No. 163,193. (No model.)

*To all whom it may concern:*

Be it known that I, CHARLES B. BAUMGARTNER, a citizen of the United States, residing at Chicago, in the county of Cook and State of Illinois, have invented certain new and useful Improvements in Wire Fencing, of which the following is a specification.

The object of this invention is to construct a wire fencing composed of horizontal wires and vertical stay-wires in a manner that the stay-wires are held against movement in the lengthwise direction of the horizontal wires.

In the accompanying drawings, Figure 1 is an elevation of a section of fencing containing my improvements. Fig. 2 is a similar elevation showing a different wrapping of the stay-wires around the horizontal wires. Fig. 3 is a section of one of the horizontal wires.

The horizontal wires 1, 2, and 3 are each formed with two offsets in series located a short distance apart, leaving a short section 4. These offsets in each wire extend at substantially the same angle—that is, the offsets 5 of wires 1 and 3 extend in an upwardly direction from the short section 4 and the offsets 6 of the same wires extend in a downwardly direction from the short sections. The offsets 7 of the horizontal wire 2 extend downwardly from the short section 4 and the offset 8 extends upwardly from the short section. The short sections of one horizontal wire are in a vertical line with the short sections of the other horizontal wires. These short sections of the horizontal wires are connected by stay-wires 9 and 10 in Fig. 1 and stay-wires 11 and 12 in Fig. 2. These stay-wires have their ends wrapped around the short sections of the horizontal wires. Each stay-wire forms a connection between two horizontal wires.

It will be noticed that the distance between the horizontal wires at *a* is greater than the vertical distance between the short sections of the horizontal wires. Consequently the stay-wires cannot move in the lengthwise direction of the horizontal wires.

Any or all the ends of the stay-wires may be projected in barb form.

I claim as my invention—

1. A wire fencing composed of horizontal wires, each having two offsets in sections leaving short lengthwise sections, the two offsets extending at substantially the same angle from the short sections, and the offsets of each alternate horizontal wire extending oppositely to the offsets in the horizontal wires above and below it, and stay-wires connecting the short sections of the horizontal wires.

2. In a wire fence, a plurality of horizontal strand-wires, seats formed in said strand-wires, guards projecting in opposite directions from opposite ends of the seats, the guard at one end of each seat projecting upwardly and the guard at the other end of the seat projecting downwardly, both guards extending in parallel diagonal planes, and stay-wires coming from opposite directions, meeting in said seats and coiled around the seats.

CHARLES B. BAUMGARTNER.

Witnesses:
WALTER A. BOYNTON,
E. B. NICOL.